Dec. 10, 1940.      H. C. PETERSON      2,224,522
COUPLING PIN
Filed Nov. 7, 1939      2 Sheets-Sheet 1
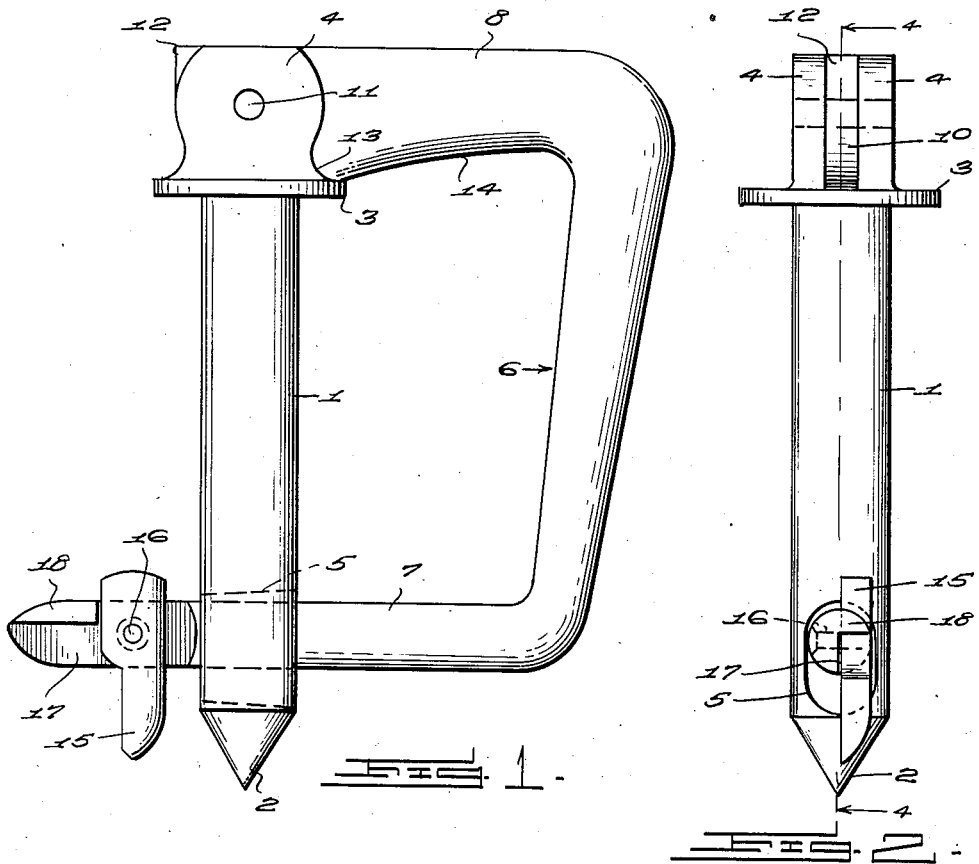
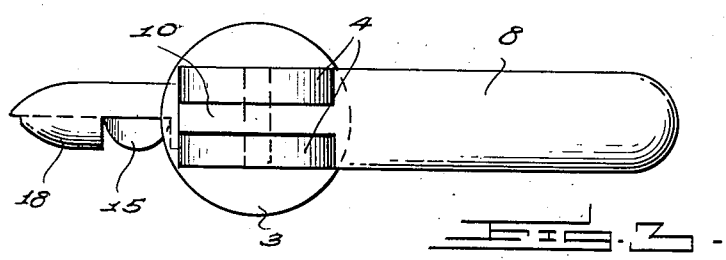
Inventor
HENRY C. PETERSON,
By Clarence A. O'Brien
and Hyman Berman
Attorneys Dec. 10, 1940.  H. C. PETERSON  2,224,522
COUPLING PIN
Filed Nov. 7, 1939  2 Sheets-Sheet 2
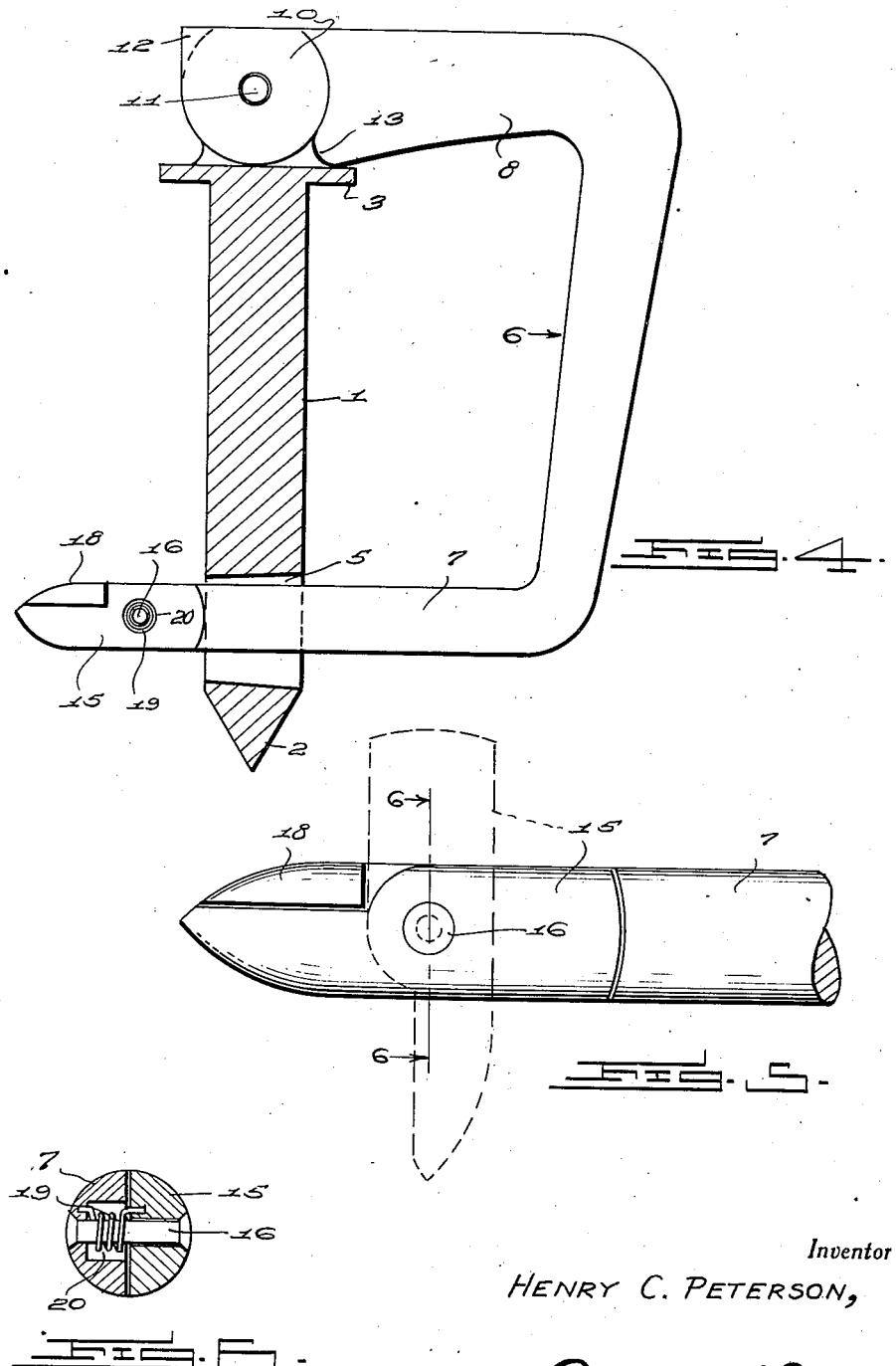
Inventor
HENRY C. PETERSON,
By Clarence A. O'Brien
and Hyman Berman
Attorneys Patented Dec. 10, 1940

2,224,522

UNITED STATES PATENT OFFICE 2,224,522

COUPLING PIN

Henry C. Peterson, Philomath, Oreg.

Application November 7, 1939, Serial No. 303,304

1 Claim. (Cl. 280—33.15)

My invention relates to improvements in coupling pins for use in trailer hitches, car couplings, hitches between farm implements and in other similar capacities.

The principal object in view is to provide a simply constructed, low cost device of this character adapted to automatically lock against removal and which may be quickly applied and detached when desired with safety.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in side elevation of the preferred embodiment of my invention, Figure 2 is a view in front elevation, Figure 3 is a view in top plan, Figure 4 is a view in longitudinal section taken on the line 4—4 of Figure 1 looking in the direction indicated by the arrows, Figure 5 is a view in side elevation drawn to an enlarged scale of the leading end of the shackle member and locking dog thereon, and Figure 6 is a view in transverse section taken on the line 6—6 of Figure 5 looking in the direction indicated by the arrows.

Describing my invention in detail with reference to the drawings by numerals, the basic element thereof is a preferably cylindrical shank I having a pointed leading end 2 and a head at the other end thereof comprising a disk-like flange 3 surmounted by a pair of laterally spaced centrally apertured ears 4 extending from said flange upon opposite sides of the axis of the shank respectively. Adjacent the pointed end 2 thereof said shank I is provided with a diametrical aperture 5 therein elongated lengthwise of said shank.

The head of the shank I has mounted therein for swinging movement in a plane coincident with the axis of the shank, a bail-shaped shackle 6 including a pair of substantially parallel long and short arms 7, 8, respectively, and a connecting arm 9. The mounting for the shackle 6 includes the ears 4, a terminal flat eye 10 on the short arm fitting between said ears, and a stud 11 passing through said eye and ears and suitably secured in the latter.

The shackle 6 is arranged to be swung away from the shank I into an open position so that the shank may be inserted in a hitch, not shown, and then swung toward the shank into a closed position to extend the free end of the long arm 7 through the aperture 5 and thereby block withdrawal of the shank from the hitch.

A corner stop lug 12 is provided on the eye 10 of the short arm 8 for coaction with the flange 3 to limit opening movement of the shackle 6, said lug and flange abutting when the short arm 8 is substantially coaxial with the shank I whereby the shackle is permitted to be swung to a wide open position but prevented from swinging past such position and thereby becoming awkward to handle. A similar stop lug 13 is provided on the short arm 8 diagonally opposite the lug 12 and to similarly coact with said flange 3 and limit closing movement of said shackle 6 to a position in which the arms 7, 8, are at substantial right angles to the shank I.

The inner edge of the short arm 8 is inclined inwardly of said arm so that in the closed position of the shackle 6, said arm will not interfere with the hitch or coupling.

The aperture 5 is of the proper length to permit the free end of the long arm 7 to swing through and beyond the shank I under closing movement of said shackle 6, the bottom of said aperture being beveled, as at 14, to facilitate such swinging and eliminate unnecessary clearance.

A locking dog 15 of elongated form is pivoted intermediate its ends, as at 16, on the free end of the long arm 7 of the shackle 6, said pivot extending transversely of the plane of the shackle so that said dog may be swung crosswise of the arm 7 and thereby obstruct withdrawal of the free end of short arm 8 from the aperture 5 whereby the shackle 6 is locked in closed position. The free end of the long arm 7 is reduced in thickness, in part, as at 17, and said dog 15 set into the reduced part so as to be swung into a position parallel with said arm and out of obstructing position whereby the shackle 6 is unlocked as will be clear. A lateral abutment lug 18 is provided on the reduced part 17 for engagement by the dog 14 to limit movement of the latter to said parallel position. The reduced part 17, dog 14 and lug 18 are constructed and arranged so that in the parallel, unobstructing position of the dog 15 these elements form a uniformly sized free end on the arm 7 of pointed form. A coil spring 19 sleeved onto the pivot 16 and housed in a recess 20 in the arm 7 with its ends suitably connected to the reduced part 17 and dog 15, respectively, urges the latter into crosswise obstructing position. In this position of said dog 15 one edge thereof engages the lug 18 and thereby establishes said position of the dog.

As will now be seen, in order to swing the shackle 6 to closing position it is merely necessary to swing the locking dog 15 into the described parallel unobstructed position against the tension of the spring 19 and insert the free end of the long arm 7, together with said dog, through the aperture 5. Such swinging of the dog 15 may be accomplished by manipulation of the proper end of the dog 15 by the thumb with the arm 7 grasped by the hand. After the free end of said arm 7 passes beyond said aperture 5, and as will be obvious, the dog 15 is free for operation by the spring 19 into obstructing position. In order to swing the shackle 6 to open position it is merely necessary to again swing the dog 15 to parallel unobstructing position, pull the shackle in the proper direction until said dog enters the aperture 5 and then continue the pull whereupon said dog will be dragged through said aperture endwise and out of the same.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

A coupling pin comprising a cylindrical shank having a bifurcated head end, and a tail end provided with a diametrical slot therein, a substantially U-shaped shackle having one end interposed between the furcations of said head end and pivoted thereto for swinging movement of the shackle toward and from said shank to advance the other end of said shackle through said slot and to retract said end, respectively, said other end of the shackle being rabbeted at one side thereof, a locking dog pivoted intermediate its ends in said rabbet for swinging movement into a position crosswise of said end to obstruct retraction of said end, said dog being swingable into said rabbet to extend lengthwise of said other end into unobstructing position, and a stop lug in said rabbet establishing both the obstructing and unobstructing positions of said dog, the shackle being recessed around said dog pivot, and a coiled spring in said recess surrounding the dog pivot and urging said dog into obstructing position.

HENRY C. PETERSON.